US012645220B2

(12) United States Patent (10) Patent No.: US 12,645,220 B2
Mujica et al. (45) Date of Patent: *Jun. 2, 2026

(54) AUTOMATION CONTROL USING STOP TRAJECTORIES

(71) Applicant: Apple Inc., Cupertino, CA (US)

(72) Inventors: Fernando A. Mujica, Los Altos, CA (US); Mark P. Colosky, Sunnyvale, CA (US); Jamie M. Waydo, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 18/765,948

(22) Filed: Jul. 8, 2024

(65) Prior Publication Data

US 2025/0044799 A1 Feb. 6, 2025

Related U.S. Application Data

(63) Continuation of application No. 17/573,932, filed on Jan. 12, 2022, now Pat. No. 12,032,378.

(Continued)

(51) Int. Cl.
| | |
|---|---|
| *G05D 1/00* | (2024.01) |
| *G05B 15/02* | (2006.01) |
| *G05D 1/617* | (2024.01) |

(52) U.S. Cl.
CPC .......... *G05D 1/0214* (2013.01); *G05B 15/02* (2013.01); *G05D 1/617* (2024.01)

(58) Field of Classification Search
None
See application file for complete search history.

(56) References Cited

U.S. PATENT DOCUMENTS

| | | | |
|---|---|---|---|
| 6,393,362 B1 | 5/2002 | Burns | |
| 10,747,223 B1 | 8/2020 | Eade et al. | |

(Continued)

FOREIGN PATENT DOCUMENTS

| | | |
|---|---|---|
| CN | 108475055 A | 8/2018 |
| CN | 111344646 A | 6/2020 |

(Continued)

OTHER PUBLICATIONS

Lars Svensson et al., Safe Stop Trajectory Planning for Highly Automated Vehicles: An Optimal Control Problem Formulation, http://www.diva-portal.org, http://urn.kb.se/resolve?urn= urn:nbn:se:kth:diva-232815, 2018, 7 pages.

(Continued)

*Primary Examiner* — Jason Holloway
*Assistant Examiner* — Bryant Tang
(74) *Attorney, Agent, or Firm* — Kowert, Hood, Munyon, Rankin & Goetzel, P.C.; Paul T. Seegers; Dean M. Munyon

(57) ABSTRACT

In an embodiment, an automation controller periodically generates stop trajectories and controls actuators to follow the stop trajectories. As long as new stop trajectories continue to be generated, the automation controller may follow a destination trajectory that is formed from the first portion of each stop trajectory. If stop trajectories are not generated for a period of time (e.g., due to failure in one or more computers generating the stop trajectories), the automation controller may continue to follow the most recent stop trajectory and bring the mobile machine to a stop.

20 Claims, 9 Drawing Sheets

Related U.S. Application Data

(60) Provisional application No. 63/136,308, filed on Jan. 12, 2021.

(56) References Cited

U.S. PATENT DOCUMENTS

| | | |
|---|---|---|
| 2019/0079513 A1 | 3/2019 | Greenfield et al. |
| 2019/0278276 A1 | 9/2019 | Liangliang et al. |
| 2019/0317515 A1 | 10/2019 | Zhang et al. |

FOREIGN PATENT DOCUMENTS

| | | |
|---|---|---|
| CN | 111857118 A | 10/2020 |
| WO | 2018017094 A1 | 1/2018 |

OTHER PUBLICATIONS

Silvia Magdici and Matthias Althoff, Fail-Safe Motion Planning of Autonomous Vehicles, 2016 IEEE 19th International Conference on Intelligent Transportation Systems (ITSC) Rio de Janeiro, Brazil, Nov. 1-4, 2016, 7 pages.

Krook, J., Svensson, L., Li, Y et al (2019) Design and Formal Verification of a Safe Stop Supervisor for an Automated Vehicle2019 International Conference on Robotics and Automation (ICRA): 2019 International Conference on Robotics and Automation (ICRA) Montreal, Canada, May 20-24, 2019, 8 pages.

ISRWO, PCT/US2022/012144, mailed Mar. 14, 2011, 13 pages.

Computer Accessible Storage
Medium 200

Automation
Code
202

FIG. 10

AUTOMATION CONTROL USING STOP TRAJECTORIES

The present application is a continuation of U.S. application Ser. No. 17/573,932, entitled "Automation Control Using Stop Trajectories," filed Jan. 12, 2022, which claims benefit of U.S. Provisional Appl. No. 63/136,308, filed Jan. 12, 2021. The above application is incorporated herein by reference in its entirety. To the extent that any material in the incorporated application conflicts with material expressly set forth herein, the expressly-set-forth material controls.

BACKGROUND

Technical Field

Embodiments described herein are related to automated mobile machine control, and more particularly to control of mobile machines using stop trajectories.

Description of the Related Art

Advances in mobile machine automation are proceeding at a rapid pace as more companies become involved in development of automation solutions. Generally, mobile machine automation can require highly accurate sensing of the environment in which the mobile machine is operating (e.g., the path being followed by the mobile machine, other mobile machines, stationary objects, obstructions in the pathway, etc.). The control mechanisms for the mobile machine are also required to be highly accurate and resistant to failure when components within the mobile machine fail, retaining control of the mobile machine and continuing operation or bringing the mobile machine to a stop.

Ideally, the mobile machine departs from a location and arrives at a destination location uneventfully, in some cases transporting payloads to a destination without any noticeable signs of unexpected events or behaviors. To support this goal, high performance computer systems are often employed in the automation controller to sense the environment, plan a trajectory, and implement the trajectory by controlling the mobile machine. If a failure occurs, the automation controller can stop the mobile machine. However, determining that a failure has occurred in the system is complex and difficult to implement. If the automation controller is too conservative and detects failure more often than failure actually occurs, it may exhibit unexpected behavior and payloads may be delayed or disrupted. On the other hand, if the automation controller is too aggressive and does not detect failure when failure actually occurs, the mobile machine may be unable to complete its mission.

BRIEF DESCRIPTION OF THE DRAWINGS

The following detailed description refers to the accompanying drawings, which are now briefly described.

FIG. 10 is a block diagram of embodiment of a computer accessible storage medium.

Figure 1:
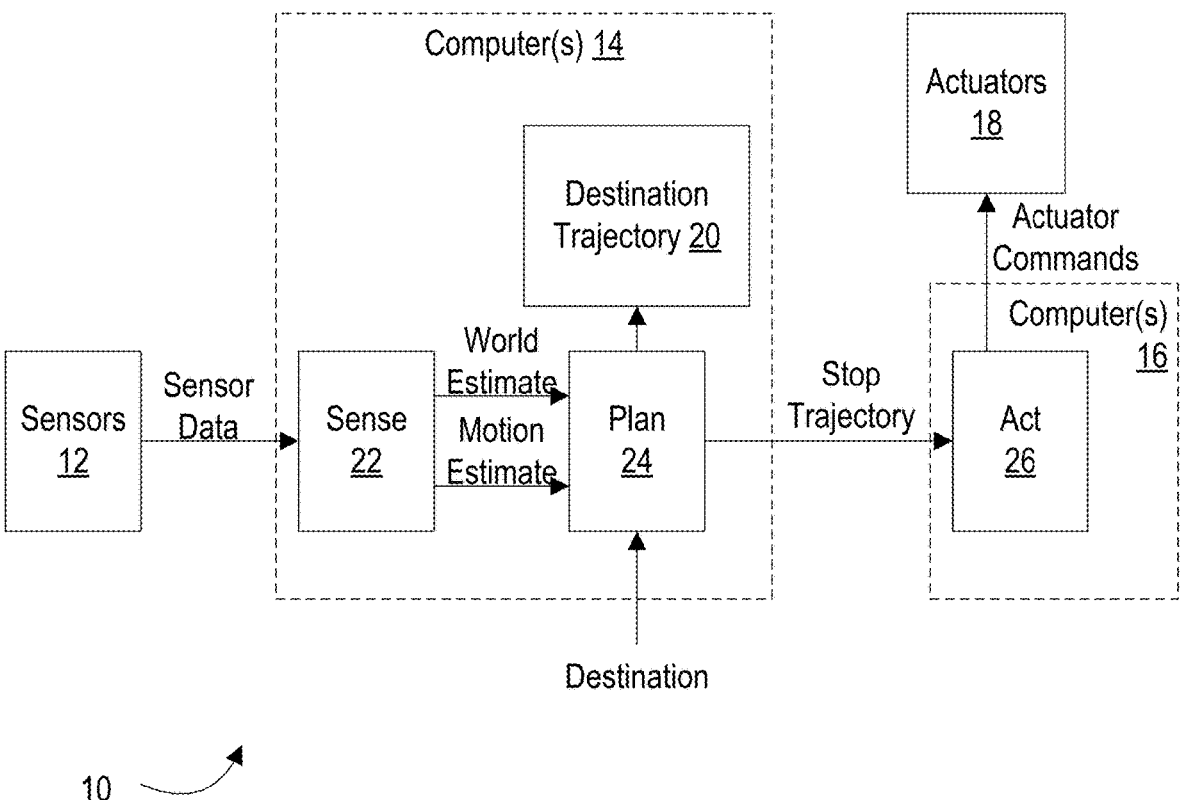
FIG. 1 is a block diagram of one embodiment of an automation controller.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

FIG. 1 is a block diagram of one embodiment of an automation system 10. In the illustrated embodiment, the system 10 may include a plurality of sensors 12, one or more first computers 14, one or more second computers 16, and a plurality of actuators 18. The sensors 12 are coupled to the computers 14, which are coupled to the computers 16. The computers 16 are coupled to the actuators 18.

In some embodiments, the computers 14 receive a destination (e.g., from a user input device, a storage device, a network interface, etc.). In some embodiments, the automation system 10 is to direct a mobile machine using the actuators 18 from its current location to the destination. For example, global position system (GPS) or other geo-location data such as triangulation from cell towers or the like may be used to determine the current location, and map information may be used with various navigation algorithms to determine a route from the current location to the destination. In an embodiment, current environmental conditions (e.g., traffic conditions, weather conditions, potential obstacles in the route, etc.) may be considered in determining the route as well, attempting to minimize travel time.

More generally, the automation system 10 may be configured, in some embodiments, to control the motion of the mobile machine through space. The mobile machine may be any machine capable of spatial movement, even if the space in which the machine is capable of moving is restricted. For example, the mobile machine may be a robot that performs a task within a confined space. The robot may be fixed to the floor, but may have appendages (e.g., "arms") that automatically perform (under the control of the automation system 10) a defined task such as assembly, welding, painting, and the like. The robot may be fully mobile, and may be designed to move payloads from location to location in a warehouse, factory, or the like. The robot may be configured to perform a task that includes motion (e.g., a vacuum cleaner that automatically vacuums a floor, in which the payload may be the refuse collected by the vacuum cleaner; an automated lawn mower that cuts a lawn; etc.). Mobile machines may include any type of land, water, air, or space-based vehicles such as cars powered by internal combustion gasoline engines, diesel engines, hybrid engines, full electric engines, etc. The mobile machine may include pickup trucks and larger trucks that transport goods (e.g., "semis"). The mobile machine may include buses and other mass transportation vehicles. The mobile machine may include motorcycles. Water-based mobile machines may include boats, ships, submarines, sailboats, etc. Air-based mobile machines may include aircraft (e.g., airplanes, drones, blimps, helicopters, etc.). Space-based vehicles may include rockets, capsules, satellites, space stations, etc.

Mobile machines may move along a pathway under control of the automation system 10. The pathway may be any permitted route from the current location to a destination, and may depend on the character of the mobile machine. For example, the pathway may be a land-based pathway (e.g., a roadway, a sidewalk, a pathway defined within a building, a path that covers a prescribed area, etc.), a water-based pathway (e.g., a channel, shipping lanes, a riverbed, etc.), an airspace-based pathway (e.g., the direction of movement of a robotic arm, air travel routes, etc.), or space-based pathways (e.g., orbits, launch flight paths, etc.). Pathways may include one or more paths in which the mobile machine may travel (e.g., the lanes of a roadway, multiple shipping lanes, parallel paths on a warehouse floor, flight paths in the air, orbital paths, etc.).

The automation system 10 may be configured to initiate motion in the mobile machine, sensing the pathway as well as various other objects in the area around the mobile machine using the sensors 12 (communicated as "sensor data" to the computers 14 in FIG. 1). The objects may include other mobile machines, pedestrians, animals, fixed objects such as buildings, signs, trees, other large flora, etc., other moving objects, furniture and other indoor furnishings for inside pathways, etc. The automation system 10 may be configured to plan a destination trajectory 20 which guides the mobile machine toward the destination, avoiding other objects (e.g., obstructions or obstacles) detected by the sensors 12. The destination trajectory may not be the entire route, but may rather be the trajectory planned for the near term but generally along the route to the destination. The destination trajectory may be planned for several seconds or minutes into the future, and may be updated periodically based an additional sensor data from the sensors 12 and the progress of the mobile machine towards the destination. The destination trajectory is sometimes also referred to as the "long term trajectory."

In addition to the destination trajectory 20, the automation system 10 may determine a plurality of stop trajectories as the mobile machine moves along the destination trajectory. Each stop trajectory may correspond to a point along the destination trajectory, and may guide the mobile machine from the current point to a stopping point in the event that there is a failure in the system and the destination trajectory cannot continue to be updated and/or new stop trajectories cannot be generated. For example, the sensors 12 may fail in whole or in part, leaving the automation system with less information regarding nearby objects. The computers 14 may fail in whole or in part, preventing the processing of sensor data to produce new stop trajectories and updated destination trajectories. Communications mechanisms between the sensors 12 and the computers 14, or between the computers 14 and the computers 16, may fail. In 10 some embodiments, failures in the mobile machine itself may be detected and cause a stop. Failures may be temporary (e.g., occluded sensors, crashes of the computer systems 14, noise on the interfaces between the components, etc.) or more permanent hardware failures. A "stop" may generally refer to halting mobile machine motion without colliding with other objects (at least as most recently detected via the sensors 12) or otherwise damaging the mobile machine or endangering the mobile machine's payloads, if any. The stop may be planned to be smooth, decelerating at a reasonable pace that does not agitate or damage the payloads and moving to the stopping point without any rapid maneuvers such as swerves or the like, in an embodiment. If the location permits, the stopping point may be planned to be off the active pathway (e.g., in a stop zone) so as not to impede the movement of other mobile machines that may be on the active pathway. Stopping in the active pathway may be used if the situation does not permit stopping in a non-travel area such as a stop zone.

The computers 14 may be configured to transmit the stop trajectories to the computers 16, which may be configured to process the trajectories into actuator commands for the actuators 18. Since the destination trajectory is not provided, the computers 16 may be simplified and need not make decisions about when the destination trajectory is no longer useable (e.g., failure has occurred) and switching to the stop trajectory is needed. The computers 16 may simply follow the most recently provided stop trajectory. If the stop trajectories are provided at the expected time intervals (e.g., on the order of 100 millisecond intervals, or 10 millisecond intervals, or any time interval specified by the system), the difference between the stop trajectories and the destination trajectory within the interval may be minimal (e.g., less than a predefined threshold) and thus the destination trajectory may be followed as long as no failure occurs. If failure does occur, the computers 16 do not receive updated stop trajectories and may follow the most recently provided trajectory to bring the mobile machine to a stop.

As illustrated in FIG. 1, there may be three phases to the processing of sensor data into control for the mobile machine: Sense (reference numeral 22), plan (reference numeral 24), and act (reference numeral 26). The computers 14 may handle the sense and plan phases 22 and 24, and the computers 16 may handle the act phase 26. The computers 14 may receive sensor data from the sensors 12 and may process the data to generate a model of the surroundings and the mobile machine itself. The surroundings (e.g., location and identification of objects, location of the pathway, etc.) may be described by a "world estimate" provided to the plan phase. Additionally, motion estimates for objects in motion (and/or for the mobile machine itself) may be generated so that the plan phase 24 may adjust for the movement of objects as the mobile machine moves forward. The sensor data provided by the sensors 12 may be raw sensor data, or may be processed locally at the sensors 12 to produce a list of objects and relative locations to the mobile machine, or any combination thereof. For example, in one embodiment, the sensors may include cameras, radio detection and ranging (radar) sensors, and light detection and ranging (lidar) sensors. The radar and lidar sensor data may be preprocessed to identify objects, while the camera data may be provided raw. Other embodiments may implement different sensors and different combinations of preprocessed and/or raw sensor data.

In the plan phase 24, the computers 14 may use the world estimate, motion estimates, and destination information to update the destination trajectory 20 and to generate another stop trajectory. The destination trajectory 20 may be kept local to the computers 14, while the stop trajectories may be transmitted to the computers 16. In an embodiment, the destination trajectory 20 may not be explicitly generated and stored, but rather may be a factor in determining the stop trajectories.

In the act phase 26, the computers 16 may process the current (most recently received) stop trajectory to produce actuator commands to control actuators in the mobile machine. For example, acceleration, deceleration, and guidance (e.g., steering) actuators may be provided.

In an embodiment, the computers 14 may be one or more high performance computers that implement significant processing capacity to perform the sense and plan phases 22 and 24. For example, computationally intensive neural networks may be used as part of the sense and/or plan phases 22 and 24, and the computers 14 may include neural network accelerators designed to provide high performance processing of the neural networks. A certain amount of redundancy may be implemented to provide for fail degraded or fail operational operation in the phases, in an embodiment.

The computers 16 may be somewhat lower performance, but environmentally-hardened computers that implement a different level of redundancy. The computers 16 may be fail operational or partially fail operational in various embodiments.

Any combination of sensors may be placed at various locations in the mobile machine and may be configured to monitor different fields of view around the mobile machine. For example, sensors such as camera sensors (cameras), radar sensors, lidar sensors, etc. may be included. The camera may be any sort of sensor that captures a visible light image of the field of view. The camera output may be a set of pixels which indicate the color/intensity of light at that position within the frame (or picture) captured by the camera. Other types of cameras may capture other wavelengths of light (e.g., infrared cameras). The camera sensor may be a passive sensor if the sensed wavelengths is/are prevalent in the environment and reflected by objects in the environment (e.g., visible light) or are actively emitted by the objects. A given camera sensor may be an active sensor if the camera actively emits the light and observes any reflected light (e.g., infrared light).

A radar sensor may be an active sensor that emits electromagnetic waves in the radio spectrum (radio waves) and/or microwave spectrum, and observes the reflection of the radio waves/microwaves to detect objects that reflect radio waves. Radar may be used to detect the range of an object (e.g., a position and distance), velocity of the object, etc. A lidar sensor may also be an active sensor that emits electromagnetic waves having wavelengths in the light spectrum (light waves) and observing the reflections of the emitted waves. For example, lidar sensors may emit infrared wave pulses from lasers and detect reflected pulses. Other lidar sensors may use lasers that emit other wavelengths of light such as ultraviolet, visible light, near infrared, etc. Like radar, the lidar sensor may be used to detect range, velocity, etc. Additional sensors beyond those described above may be used (e.g., ultrasonic, etc.) in addition to and/or as alternatives to the above-mentioned sensors.

In accordance with this description, in one embodiment, an automation system may comprise one or more first computers configured to periodically generate a trajectory for a mobile machine to bring the mobile machine to a stop based on sensor data up to a point in time at which the trajectory is generated. The sensor data is received from a plurality of sensors on the mobile machine that sense the surroundings of the mobile machine. One or more second computers are coupled to the one or more first computers and are configured to control a plurality of actuators in the mobile machine. The one or more second computers are configured to periodically receive the trajectory from the one or more first computers, and to control the plurality of actuators to cause the mobile machine to follow a current instance of the trajectory. The one or more second computers are configured to replace the current instance of the trajectory with a subsequent instance of the trajectory received from the one or more first computers, and wherein the one or more second computers are configured to control the plurality of actuators to follow the subsequent version of the trajectory received from the one or more first computers.

As mentioned above, stop trajectories may be generated at various points in time, at a regular interval. For example, a first stop trajectory may correspond to a time $t_0$. Similarly, a second stop trajectory may correspond to a time $t_1$; a third stop trajectory may correspond to a time $t_2$; etc. The time between to and $t_1$ may be approximately equal to the time between $t_1$ and $t_2$, etc. Each stop trajectory may remain approximately parallel to the destination trajectory for an initial segment up until the next point in time at which a stop trajectory is generated. Thus, the first stop trajectory may parallel the destination trajectory from time to until time $t_1$; the second stop trajectory may parallel the destination trajectory 20 from time $t_1$ to time $t_2$, and the third stop trajectory may parallel the destination trajectory 20 from time $t_2$ to time $t_3$. Thus, the times $t_0$, $t_1$, $t_2$, $t_3$, etc. may correspond to the periodicity at which the stop trajectories are to be generated. That is, the difference in time between two consecutive times may be the period for generating the stop trajectories (and updating the destination trajectory as well to reflect newly sensed objects or changes in the objects that are in motion).

The initial segment may be generated in any fashion. For example, the initial segment may be selected from the destination trajectory 20 and the remaining segment may deviate from the destination trajectory to the stop point. Alternatively, the plan phase 24 may be configured to generate the initial segment of the stop trajectories so that they do not deviate from the destination trajectory 20 by more than a threshold amount until after the next stop trajectory should be generated.

The stop trajectory generated at a given point in time may bring the mobile machine to a halt at a location selected by the plan phase 24. Generally, the stop location or stop point may be determined based on one or more stop criteria. The stop criteria may include any desired rules that have a high likelihood of maneuvering to a stop point without colliding with any other objects, causing damage, etc. For example, various traffic conventions may be in place for the mobile machine movement in the presence of other mobile machines (e.g., roadway conventions, waterway conventions, airpath conventions, etc.), and the conventions may be used in identifying a stop point and the stop trajectory to reach the stop point. For example, the plan phase 24 may attempt to select a stop location that is least exposed to other traffic. The stop location may be the location that the mobile machine may reach without colliding with other objects and that is least obstructive to continuing movement in the pathway. Thus, if there is a stop zone to a side of the pathway, the stop point may be the stop zone. A stop zone may be any location outside of the pathway at which stopping is permissible or desirable in the overall environment. In a land-based environment, for example, a stop zone may include a shoulder of a roadway, a driveway, a designated location in a warehouse or other building, a charging port or other fueling point for the mobile machine, etc. In a water-based environment, a stop zone may include a dock, a mooring buoy, a river bank, a lake shore, a sea shore, an ocean shore, a channel boundary, etc. In air-based environment, a stop zone may include a landing zone, a helipad, an empty field, etc. If there is no stop zone, the stop point may be in the current path. If there are multiple paths, a convention may be used for selecting a stop point (e.g., the rightmost path, followed by leftmost path, followed by in-path, where right and left are based on the direction of travel).

Accordingly, in an embodiment, the automation system (e.g., the one or more first computers) may be configured to generate a stop trajectory based on the path in which the mobile machine is traveling (of one or more possible paths, for a given pathway), presence of one or more other mobile machines in the one or more paths, and/or presence of a stop zone bordering the one or more paths. For example, the one or more first computers may be configured to generate the trajectory to a point on a stop zone bordering a pathway on which the mobile machine is traveling based on existence of an unobstructed path between the mobile machine and the stop zone. In another example, the one or more first computers are configured to generate the trajectory to stop in a current path of travel for the mobile machine based on one or more obstructions between the mobile machine and the stop zone. In yet another example, the one or more first computers are configured to generate the trajectory to stop in a current path of travel for the mobile machine based on an absence of the stop zone. In this context, the stop zone may be the stop zone on the right side of the mobile machine. In some cases, a stop zone on the left side of the mobile machine may be used if it is present and there is an unobstructed path the to the left stop zone (e.g., from a left path of travel).

In an embodiment, an automation system may comprise one or more first computers configured to generate a plurality of trajectories at a plurality of points in time. A given trajectory of the plurality of trajectories includes a first segment and a second segment delineated by a difference between respective points in time of the plurality of points in time. The first segment may be derived from a destination trajectory that leads a mobile machine toward a destination, and the second segment may be derived from a stop trajectory that leads the mobile machine to a stop based on sensor data from a plurality of sensors up to a given point in time at which the given trajectory is generated. One or more second computers are coupled to the one or more first computers, wherein the one or more second computers may be configured to receive the plurality of trajectories and, at given time, are configured to control a plurality of actuators of the mobile machine to follow a most recently received trajectory of the plurality of trajectories.

Figure 2:
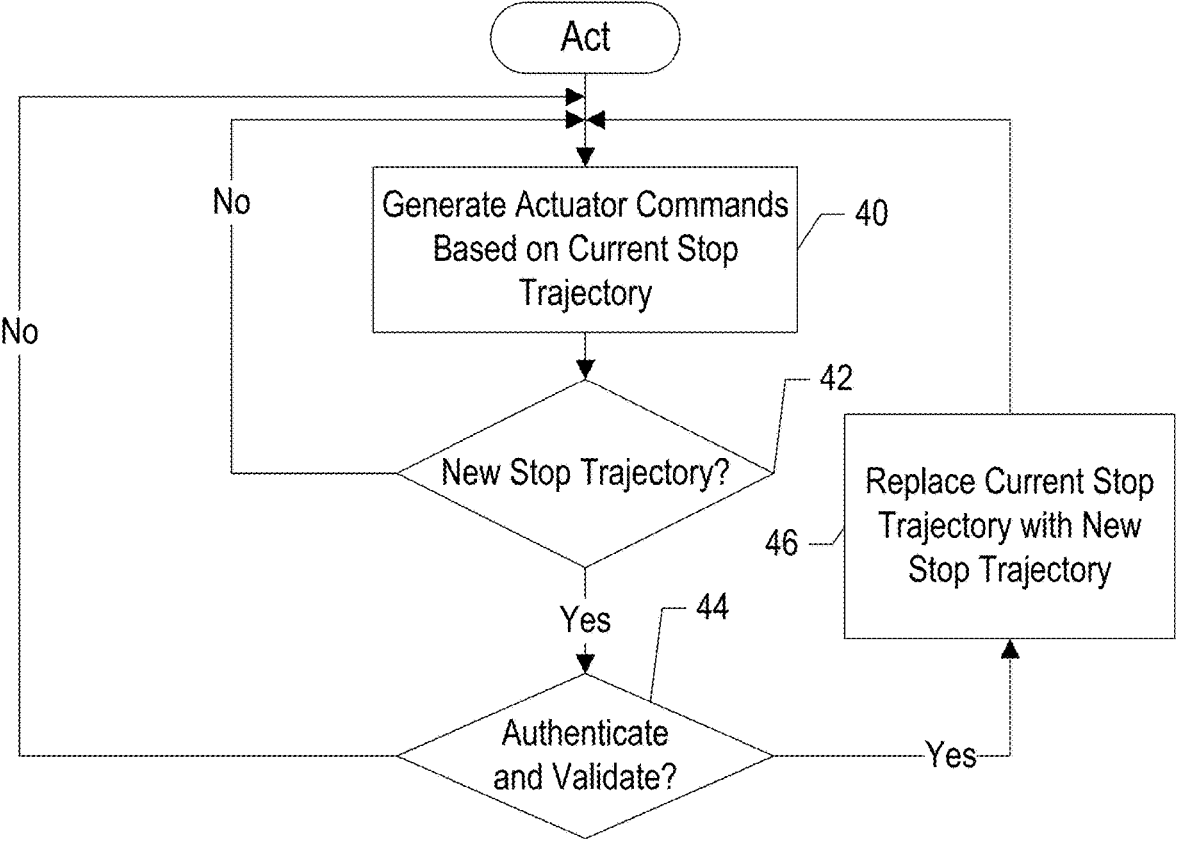
FIG. 2 is a flowchart illustrating operation of one embodiment of an act portion of the automation controller shown in FIG. 1.

FIG. 2 is flowchart illustrating one embodiment of certain operations of the act phase 26. While the blocks are shown in a particular order for ease of understanding, other orders may be used. The act phase 26 may comprise a plurality of instructions which, when executed by the computers 16, may cause operations including the operations described in FIG. 2.

The act phase 26 may include generating actuator commands based on the current stop trajectory (block 40). That is, the commands may cause the actuators to move the mobile machine along the stop trajectory. The act phase may continue generating commands based on the current stop trajectory until a new stop trajectory is received from the plan phase 24 (decision block 42, "yes" leg) and the newly received trajectory is authenticated and validated (decision block 44, "yes" leg), at which time the act phase 26 may replace the current stop trajectory with the new stop trajectory (block 46). The new stop trajectory thus becomes the current stop trajectory, and actuator commands may be generated based on the new stop trajectory (block 40). Authentication and validation may be performed to ensure that the trajectory was indeed generated by the plan phase 24 (and not, e.g., by a nefarious intrusion into the system) and to verify that the trajectory has not been changed. That is, the data describing the new stop trajectory may be cryptographically signed and may include error detection data to allow for detection of a change to the data (e.g., due to noise or other incorrect operation in the transmission of the trajectory to the act phase 26). A received stop trajectory that fails authentication and/or validation may be treated as if the trajectory were not received, in an embodiment. There may be error logging in the system, in an embodiment, and the failure (and perhaps a copy of the data) may be logged in the error log, in an embodiment.

Figure 3:
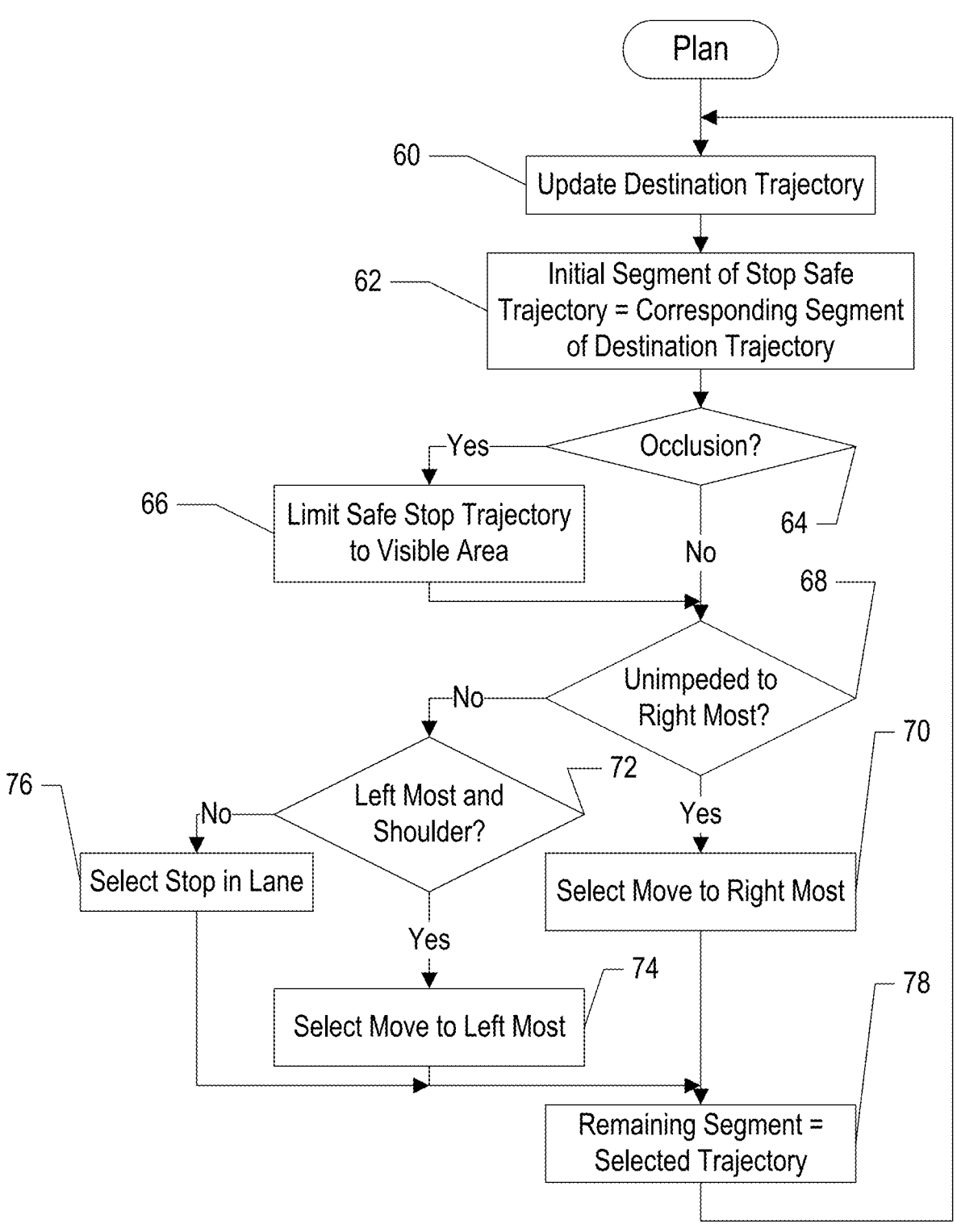
FIG. 3 is a flowchart illustrating operation of one embodiment of a plan portion of the controller shown in FIG. 1.

FIG. 3 is a flowchart illustrating one embodiment of certain operations of the plan phase 24. While the blocks are shown in a particular order for ease of understanding, other orders may be used. The plan phase 24 may comprise a plurality of instructions which, when executed by the computers 14, may cause operations including the operations described in FIG. 3.

The operation illustrated in FIG. 3 may occur during one time interval (e.g., the difference between times $t_0$ and $t_1$, times $t_1$ and $t_2$, etc. as discussed above). The plan phase may process sensor data received during the interval (and in some cases, sensor data from preceding time intervals) to update the destination trajectory (block 60). For example, newly identified objects in the surroundings may change the destination trajectory, and/or the destination trajectory may be extended to replace the portion that has been traversed with an additional planned portion farther ahead.

The plan phase 24 may also generate a new stop trajectory. An initial segment of the stop trajectory (e.g., the distance covered up to the next time interval, which depends on the speed of the mobile machine in addition to the size of the time interval) may be derived from the corresponding segment of the destination trajectory (block 62). For example, the initial segment of the stop trajectory may be equal to the corresponding segment of the destination trajectory. Alternatively, the initial segment of the stop trajectory may vary from the corresponding segment of the destination trajectory by no more than a threshold amount that leads to a lack of agitation of payloads (e.g., to avoid damage to fragile payloads, to prevent shifting or movement of payloads, to avoid jarring live payloads in a fashion that alarms the live payload, etc.) Thus, the initial segment of the trajectory may deviate from the destination trajectory by less than a predetermined amount for a period of time that is based on the periodicity of the instances of the trajectory.

The remaining segment of the stop trajectory may be generated by considering the various objects and other information in the sensor data. In an embodiment, if there is an occlusion on the destination trajectory (decision block 64, "yes" leg), the stop trajectory may be generated only in the visible area (block 66). For example, the mobile machine may be approaching an intersection of two pathways at which the destination trajectory makes a turn. The intersection maybe the intersection in a roadway, for example, or may be an intersection of two hallways in a building, or the like. The sensors may not be able to sense around the corner until the mobile machine is quite close to the corner (e.g., if there are buildings, large trees, walls, etc. on the side of the pathway). In such situations, the stop trajectory may extend beyond the intersection down the current pathway, for example, instead of attempting the turn.

Within the visible area, the plan phase 24 may determine if there is an unimpeded path to the rightmost stopping point (e.g., a stop zone, or the right path if there is no stop zone) (decision block 68). If so (decision block 68, "yes" leg), the plan phase 24 may select the move to rightmost option (block 70). If not (decision block 68, "no" leg), the plan phase 24 may determine if the mobile machine is in the leftmost path and there is a left stop zone (decision block 72). In some embodiments, the mobile machine may not be in the leftmost path but may be within N paths of the leftmost path and may use the left stop zone if there is an unimpeded path to the left stop zone. If there is an unimpeded path to the left stop zone (decision block 72, "yes" leg), the plan phase 24 may select the move to leftmost trajectory (block 74). If both the left stop zone and right stop zone cases, the plan phase 24 may also consider if there are any obstacles in the stop zone itself. If there is no unimpeded path the left stop zone, or there is no left stop zone, or the mobile machine is not in the leftmost path or N leftmost paths) (decision block 72, "no" leg), the plan phase 24 may select the stop in path trajectory (block 76). The remaining segment of the stop trajectory may be generated based on the selected trajectory (move to rightmost, move to leftmost, or stop in path) (block 78). While the rightmost is favored over the leftmost in this example, other examples may favor the leftmost over the rightmost.

The stop trajectory may include a path to follow to the selected stopping point, and may also generally include a deceleration from the current speed to stopped over the path. The deceleration may be capped at a maximum rate, so that the stop does not agitate the payload, if any. Additionally, the stop may be required to occur within a maximum amount of time (e.g., 8-10 seconds, although the time may higher or lower in various embodiments). Since the stop trajectory is followed to completion when a failure occurs and new stop trajectories are not being provided, the traversal of the stop trajectory may be performed without additional sensor data input (e.g., the automation system may be "blind" to changes in the surroundings). Accordingly, limiting the length of the stop trajectory may reduce the likelihood that an object is introduced into the path described by the stop trajectory.

In an embodiment, the automation system 10 may be further enhanced with an automatic exception stop (ES) trajectory that may modify the stop trajectory in the event that an object is introduced into the path after a failure has occurred (a "late reveal" object). The exception stop may be activated if detected while traversing the stop trajectory because of a failure in providing new stop trajectories. The late reveal object may be a previously undetected object that appears in the most recently received instance (or current instance) of the stop trajectory, for example. The late reveal object may be an object that is in motion and that unexpectedly moves into the stop trajectory, or that moves into the field of view of the sensors 12 on the mobile machine as a result of its motion.

Figure 4:
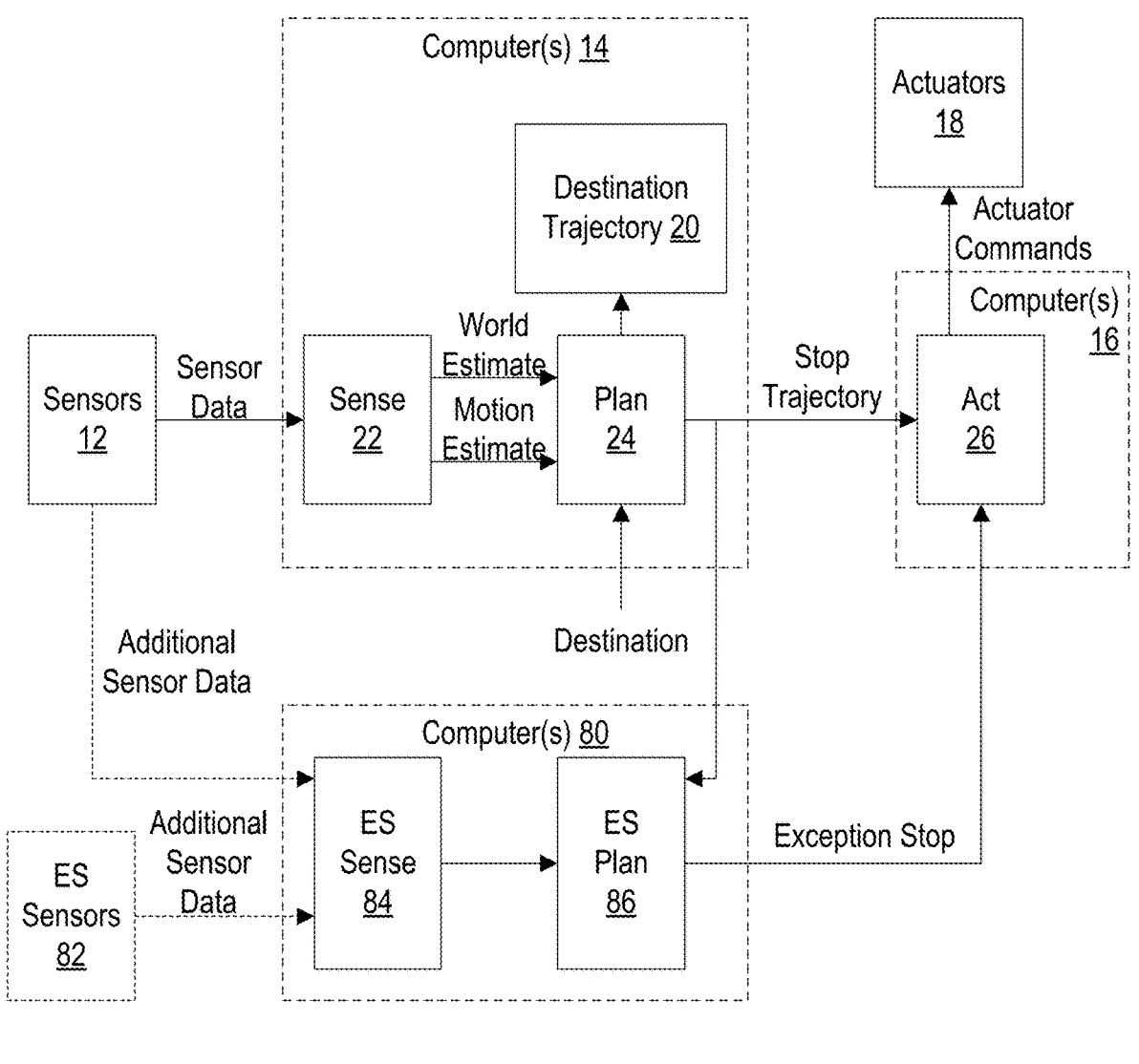
FIG. 4 is a block diagram of another embodiment of an automation controller implementing an exception stop (ES) feature.

FIG. 4 is a block diagram of one embodiment of an automation system 10 that includes exception stop features. The automation system 10 in FIG. 4 may include the sensors 12, the computers 14, the computers 16, and the actuators 18 similar to the embodiment of FIG. 1 (with the computers 14 implementing the sense and plan phases 22 and 24 and storing the destination trajectory 20, and the computers 16 implementing the act phase 26). Additionally, the automation system 10 may include one or more computers 80. The computers 80 may be coupled to a subset of the sensors 12 and/or to additional sensors 82, and may be coupled to the computers 14 and 16. More particularly, the computers 80 may be configured to receive the stop trajectories from the computers 14, and may be configured to provide an exception stop indication to the computers 16.

In an embodiment, the computers 16 may be configured to detect that one or more instances of the stop trajectory have not been received for at least N iterations of the period at which the subsequent instance should have been received. If N iterations occur in which a stop trajectory is not received, the computers 16 may be configured to enable the exception stop indication from the computers 80 (that is, the computers 80 may be a different source than the computers 14 for trajectory data). If stop trajectories are being successfully received, the computers 16 may be configured to disable the exception stop indication, in an embodiment.

In the context of "N iterations," "N" may be a positive integer, and may be set to any desired number of iterations in an embodiment. For example, N may be 2 or 3, or even a higher number or 1, in various embodiments. Generally, it may be desirable for N to be greater than 1 to eliminate intermittent errors such as noise-induced trajectory losses and the like, but a relatively small integer to provide rapid response to a sustained loss of trajectories from the computers 14.

The exception stop indication may include an assertion that an exception stop condition has been detected, as well as a description of the exception stop trajectory. In an embodiment, the exception stop trajectory may follow the most recent stop trajectory but may modify one or more aspects of the trajectory. For example, the exception stop trajectory may terminate the original stop trajectory early (e.g., the exception stop trajectory may include a more rapid deceleration than the original stop trajectory). The exception stop trajectory may modify the original stop trajectory with an evasive maneuver to avoid the late reveal object. In other embodiments, the exception stop trajectory may be independent of the most recent stop trajectory and may be provided in a similar format to the stop trajectories.

The computers 80 may receive sensor data from a subset of the sensors 12 and/or from one or more ES sensors 82. Any combination of the subset of the sensors 12 and the ES sensors 82 may be used. That is, embodiments that employ only a subset of the sensors 12, only the ES sensors 82, and a combination of the subset of the sensors 12 and the ES sensors 82 are contemplated. The sensors 12 may supply the ES sensor data using a different connection to the computer 80 than the connection to the computers 14 (to protect against failure in the path of the sensor data). In an embodiment, the sensors 12 that provide the ES sensor data may provide a lower bandwidth stream of sensor data (e.g., the data may be lower resolution than the data provided by the corresponding sensor to the computers 14). Accordingly, the exception stop may be a coarser decision-making process than the planning of the destination trajectories and stop trajectories by the computers 14. In some embodiments, the exception stop may be subject to more "false positive" identifications of obstacles in the path. However, since the exception stop functionality is provided to avoid collisions when a failure in the main system (e.g., computers 14 or one or more of the sensors 12), some number of false positives may be acceptable.

The computers 80 may implement a sense phase 84 and a plan phase 86 to detect late reveal objects/obstacles in the stop trajectories and to generate the exception stop indication for the computers 16. The sense phase 84 may process the receive ES sensor data in a manner similar to the sense phase 22, and may provide a world estimate to the ES plan phase 86 (or simply a set of objects) and the ES plan phase 86 may plan the ES stop trajectory based on the sensed objects.

Figure 5:
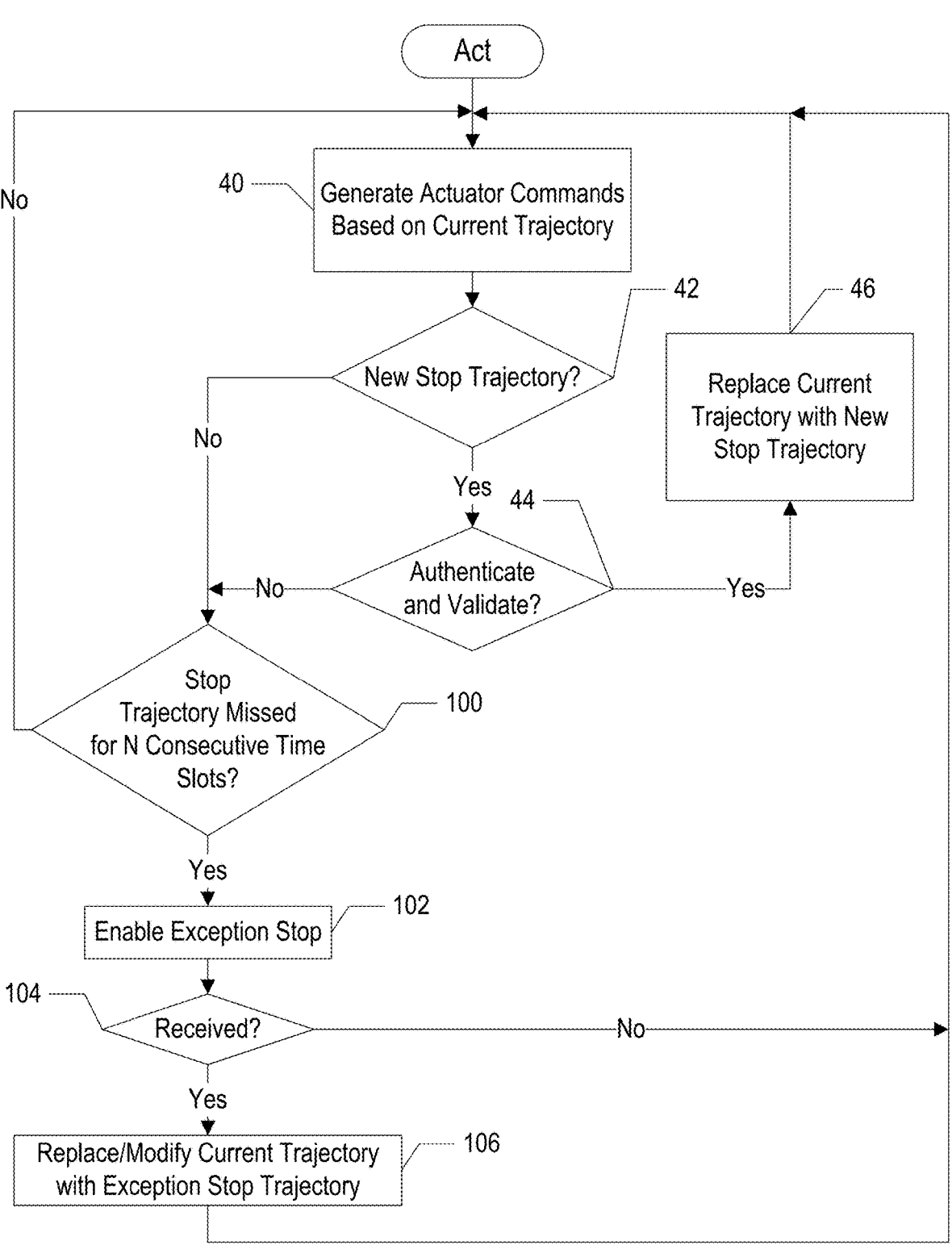
FIG. 5 is a flowchart illustrating operation of anther embodiment the act portion of the automation controller.

FIG. 5 is a flowchart illustrating certain operation of one embodiment of the act phase 26 with exception stop functionality. While the blocks are shown in a particular order for ease of understanding, other orders may be used. The act phase 26 may comprise a plurality of instructions which, when executed by the computers 16, may cause operations including the operations described in FIG. 5.

Similar to the embodiment of FIG. 2, the act phase 26 may generate actuator commands based on the current trajectory (block 40), and may replace the current trajectory with a new stop trajectory if received, authenticated, and validated (decision blocks 42 and 44, "yes" legs and block 46). In the embodiment of FIG. 5, however, the current trajectory may either be a most-recently received stop trajectory or an exception stop trajectory.

If a new stop trajectory is not received at the expected point in time (decision block 42, "no" leg) or the trajectory is received but does not authenticate or validate correctly (decision block 44, "no" leg), the act phase 26 may record that the expected stop trajectory was not received and may determine if the most recent N expected stop trajectories have not been received (decision block 100). If N consecutive stop trajectories have not been received (decision block 100, "yes" leg), the act phase 26 may enable the exception stop functionality (block 102). For example, the act phase 26 may begin monitoring, or "listening" to the exception stop indication from the computers 80. If the exception stop indication is received (decision block 104, "yes" leg), the act phase 26 may replace the current stop trajectory with the exception stop trajectory (or modify the current stop trajectory as specified by the exception stop indication) (block 106). The act phase 26 may begin generating actuator commands based on the replaced/modified trajectory (block 40). If the ES stop indication is not received (decision block 104, "no" leg), the act phase 26 may continue following the current trajectory (block 40). Similarly, if the number of consecutive stop trajectories that were not received has not reached N (decision block 100, "no" leg), the act phase 26 may continue generating actuator commands based on the current trajectory (block 40).

As discussed previously, a wide variety of mobile machines and corresponding pathways are contemplated, from land-based to water-based to air-based and even space-based. One embodiment that may be particularly familiar is an automobile or other vehicle operated on a roadway. Further examples with regard to this embodiment are presented below with regard to FIGS. 6-9.

Figure 6:
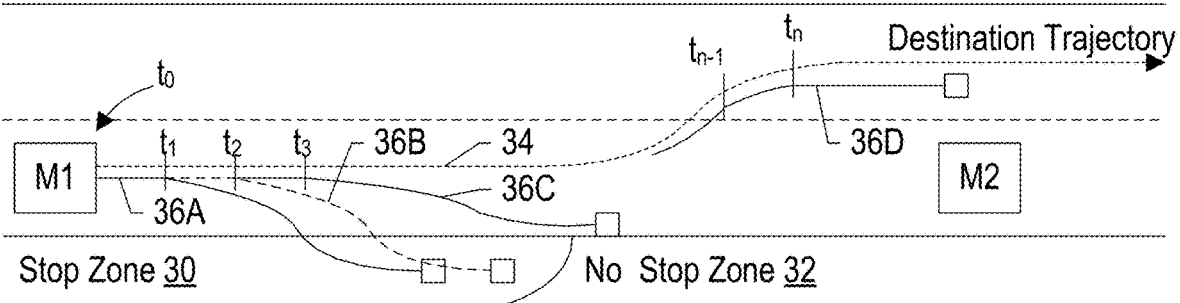
FIG. 6 is a block diagram of one embodiment of a destination trajectory and periodic stop trajectories.

FIG. 6 is a block diagram of one embodiment of a mobile machine M1 traveling along a roadway, and a mobile machine M2 in front of M1. The roadway includes two lanes, both with a direction of travel from left to right as illustrated in FIG. 6. For a portion of the roadway illustrated in FIG. 6, there is a stop zone (e.g., a shoulder, a parking area, a driveway, etc.) on the right side of the pathway (where right is viewed from the direction of travel) (reference numeral 30). The stop zone ends toward the middle of FIG. 6, and thus there is no stop zone for the remainder of the roadway as illustrated (reference numeral 32).

The position of the mobile machine M1 corresponds to a time to, as illustrated in FIG. 6. The destination trajectory is illustrated as a dotted line 34 in FIG. 6. As illustrated, the mobile machine M1 continues in the right lane until it begins to overtake the mobile machine M2 and passes the mobile machine by changing to the left lane.

Also illustrated in FIG. 6 are various stop trajectories 36A, 36B, and 36C. The stop trajectory 36A corresponds to the time $t_0$. Similarly, the stop trajectory 36B corresponds to a time $t_1$ and the stop trajectory 36C corresponds to the time $t_2$. Each stop trajectory may remain approximately parallel to the destination trajectory 34 for an initial segment up until the next point in time at which a stop trajectory is generated. Thus, the stop trajectory 36A parallels the destination trajectory 34 until time $t_1$, the stop trajectory 36B parallels the destination trajectory 34 from $t_1$ to $t_2$, and the stop trajectory 36C parallels the destination trajectory 34 from $t_2$ to $t_3$. Thus, the times $t_0$, $t_1$, $t_2$, $t_3$, etc. may correspond to the periodicity at which the stop trajectories are to be generated. That is, the difference in time between two consecutive times as illustrated in FIG. 6 may be the period for generating the stop trajectories (and updating the destination trajectory 34 as well to reflect newly sensed objects or changes in the objects that are in motion).

The initial segment may be generated in any fashion. For example, the initial segment may be selected from the destination trajectory 34 and the remaining segment may deviate from the destination trajectory 34 to the stop point. Alternatively, the plan phase 24 may be configured to generate the initial segment of the stop trajectories so that they do not deviate from the destination trajectory 34 by more than a threshold amount until after the next stop trajectory should be generated. The threshold amount may be based on a human payload's perception: that is, if there are no failures in the system, the mobile machine should be perceived by the payload as smoothly tracking along the destination trajectory 34.

The stop trajectory 36A-36D generated at a given point in time may bring the mobile machine smoothly to a halt at a location selected by the plan phase 24. The plan phase 24 may attempt to select a stop location that is least exposed to other traffic. That is, the stop location may be the location that the mobile machine may reach without colliding with other objects and that is least obstructive to continuing traffic in the roadway. Thus, if there is a stop zone to the right of the roadway, the stop point may be the stop zone. The stop zone is the stop point for trajectories 36A and 36B in FIG. 6. If there is no stop zone, the stop point may be in the right lane of travel, such as the trajectory 36C shown in FIG. 6. The trajectory may move the mobile machine as far to the right as possible in the lane, as shown in FIG. 6, or may stop in the lane directly.

In other cases, it may not be possible to move to the right. For example, at the points $t_{n-1}$ and $t_n$ in FIG. 6, the existence of the mobile machine M2 in the right path may make it imprudent to attempt to move to the right path. The stop trajectory 36D may thus stop in the left path as shown in FIG. 6.

Accordingly, the automation system (e.g., the one or more first computers) may be configured to generate a stop trajectory based on the lane in which the mobile machine is traveling (of one or more possible lanes, for a given roadway), presence of one or more other mobile machines in the one or more lanes, and presence of a stop zone bordering the one or more lanes. For example, the one or more first computers may be configured to generate the trajectory to a point on a stop zone bordering a roadway on which the mobile machine is traveling based on existence of an unobstructed path between the mobile machine and the stop zone. In another example, the one or more first computers are configured to generate the trajectory to stop in a current lane of travel for the mobile machine based on one or more obstructions between the mobile machine and the stop zone. In yet another example, the one or more first computers are configured to generate the trajectory to stop in a current lane of travel for the mobile machine based on an absence of the stop zone. In this context, the stop zone may be the stop zone on the right side of the mobile machine. In some cases, a stop zone on the left side of the mobile machine may be used if it is present and there is an unobstructed path to the left stop zone (e.g., from a left lane of travel).

In an embodiment, an automation system may comprise one or more first computers configured to generate a plurality of trajectories at a plurality of points in time. A given trajectory of the plurality of trajectories includes a first segment and a second segment delineated by a difference between respective points in time of the plurality of points in time. The first segment may be derived from a destination trajectory that leads a mobile machine toward a destination, and the second segment may be derived from a stop trajectory that leads the mobile machine to a stop based on sensor data from a plurality of sensors up to a given point in time at which the given trajectory is generated. One or more second computers are coupled to the one or more first computers, wherein the one or more second computers may be configured to receive the plurality of trajectories and, at a given time, are configured to control a plurality of actuators of the mobile machine to follow a most recently received trajectory of the plurality of trajectories.

Figure 7:
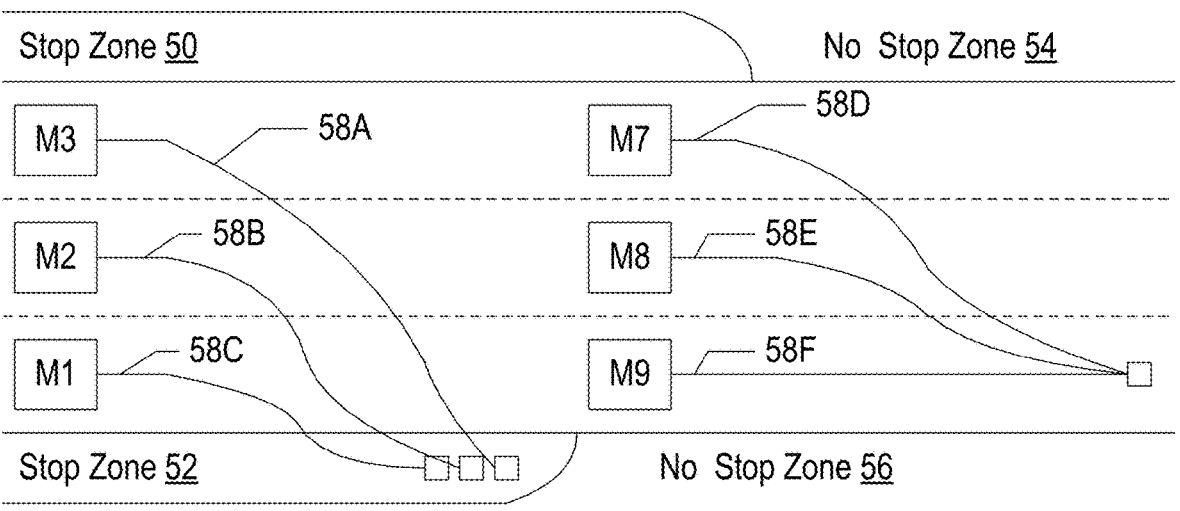
FIG. 7 is a block diagram illustrating one embodiment of stop trajectories.
Figure 8:
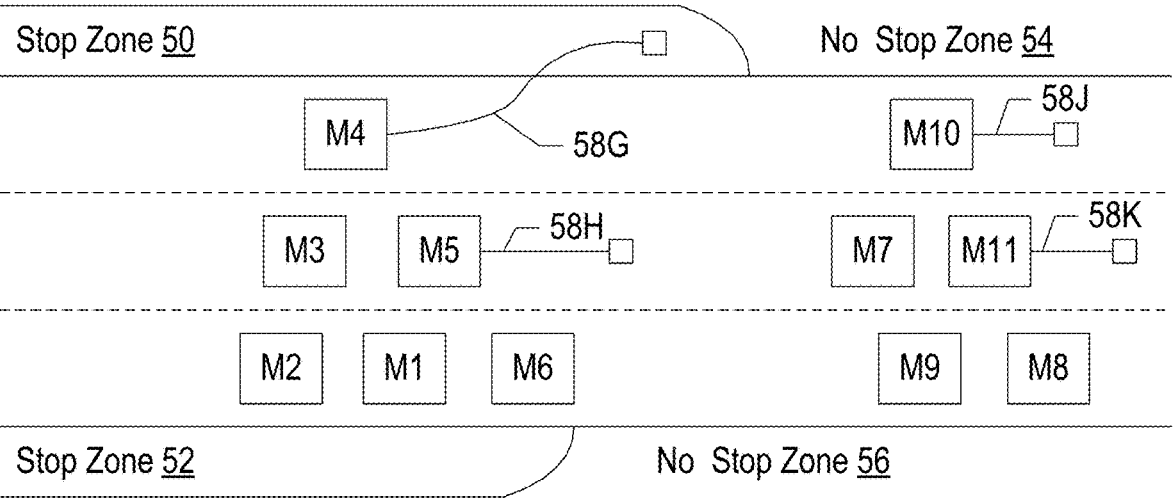
FIG. 8 is a block diagram illustrating another embodiment of stop trajectories.

FIGS. 7 and 8 are block diagrams illustrating stop trajectory generation for various scenarios. In each figure, three lanes of roadway are shown with traffic traveling from left to right in the figure. Thus, the right side of the roadway (based on the direction of travel of the mobile machine) is on the bottom of each figure and the left side is on top. There is a stop zone on the left and right side of the roadway for a portion of the roadway (reference numerals 50 and 52, respectively), and no stop zone for another portion of the roadway (reference numerals 54 and 56, respectively). FIG. 7 illustrates stop trajectories that may be generated in light traffic conditions, and FIG. 8 illustrates stop trajectories that may be generated in heavy traffic.

Generally, the stop trajectories that move the mobile machine to the right side of the roadway may be preferable to other trajectories, in this embodiment. The right side of the roadway is where the slowest moving traffic is expected to travel (and there may be a stop zone as well). For example, moving to the right to allow faster moving traffic to overtake a mobile machine to the left is a traffic law that mobile machines are expected to follow in many locations.

As shown in FIG. 7, if there is an unimpeded path to the right stop zone 52, the stop trajectory may be generated to bring the mobile machine to a stop in the right stop zone 52. For example, stop trajectories 58A-58C may be generated from mobile machines in any of the lanes to the right stop zone 52. In the case where there is no stop zone 56 on the right side (or there are obstructions in the right stop zone 52), the stop trajectories may move the mobile machine to the rightmost lane such as trajectories 58D-58F. Still further, in an embodiment, the stop trajectories may move the mobile machine to a lane that is more to the right, if the rightmost lane is occupied or there is not an unimpeded path to the rightmost lane. FIG. 7 is intended to show light traffic conditions (e.g., when there are few or no mobile machines in close proximity to a given mobile machine having the illustrated stop trajectories). Thus, for example, in FIG. 7, the trajectory 58A may be generated if the mobile machines M1 and M2 are not present or are farther ahead of or behind the mobile machine M3. The three mobile machines are shown to illustrate the trajectories from any lane to the right stop zone or lane.

In FIG. 8, various stop trajectories 58G, 58H, 58J, and 58K are illustrated for heavier traffic conditions. In heaver traffic, mobile machines traveling in other than the rightmost lane may not have an unobstructed path to the right (e.g., mobile machine M5 is blocked by mobile machines M1 and M6, mobile machine M4 is blocked by mobile machines M3 and M5, mobile machine M11 is blocked by mobile machine M8 and M9, and mobile machine M10 is blocked by mobile machines M7 and M11). Mobile machines in the rightmost lane may stop in the stop zone 52 or in the rightmost lane if there is no stop zone (or there are obstacles in the stop zone 52).

Mobile machines in the left lane of travel may generate a stop trajectory 58G to the left stop zone 50, in an embodiment, or may stop in the leftmost lane (stop trajectory 58J) if there is no left stop zone 50 or the left stop zone 50 has obstacles. Mobile machines in middle lanes (not leftmost or rightmost) may stop in lane in crowded conditions (trajectories 58H and 58K). In some embodiments, more than one leftmost lane may attempt to move to the left in heavy traffic conditions if there is an unobstructed path to the left.

This, in order of preference for one embodiment, the stop trajectory may be generated to the right stop zone 50, to the left stop zone 52 from the leftmost lane or lanes (assuming there are no lanes of oncoming traffic between the leftmost lanes and the left stop zone) or to stop in lane (rightmost preferable, or in the current lane of travel).

It is noted that generation of stop trajectories related to FIGS. 6, 7 and 8 are described in accordance with traffic conventions of the United States of America. However, exception stop trajectories can be determined in accordance with any suitable traffic conventions (e.g., traffic conventions of the United Kingdom, etc.). It is further noted that the trajectories and other features illustrated in FIGS. 6, 7, and 8 are not necessarily to scale.

Figure 9:
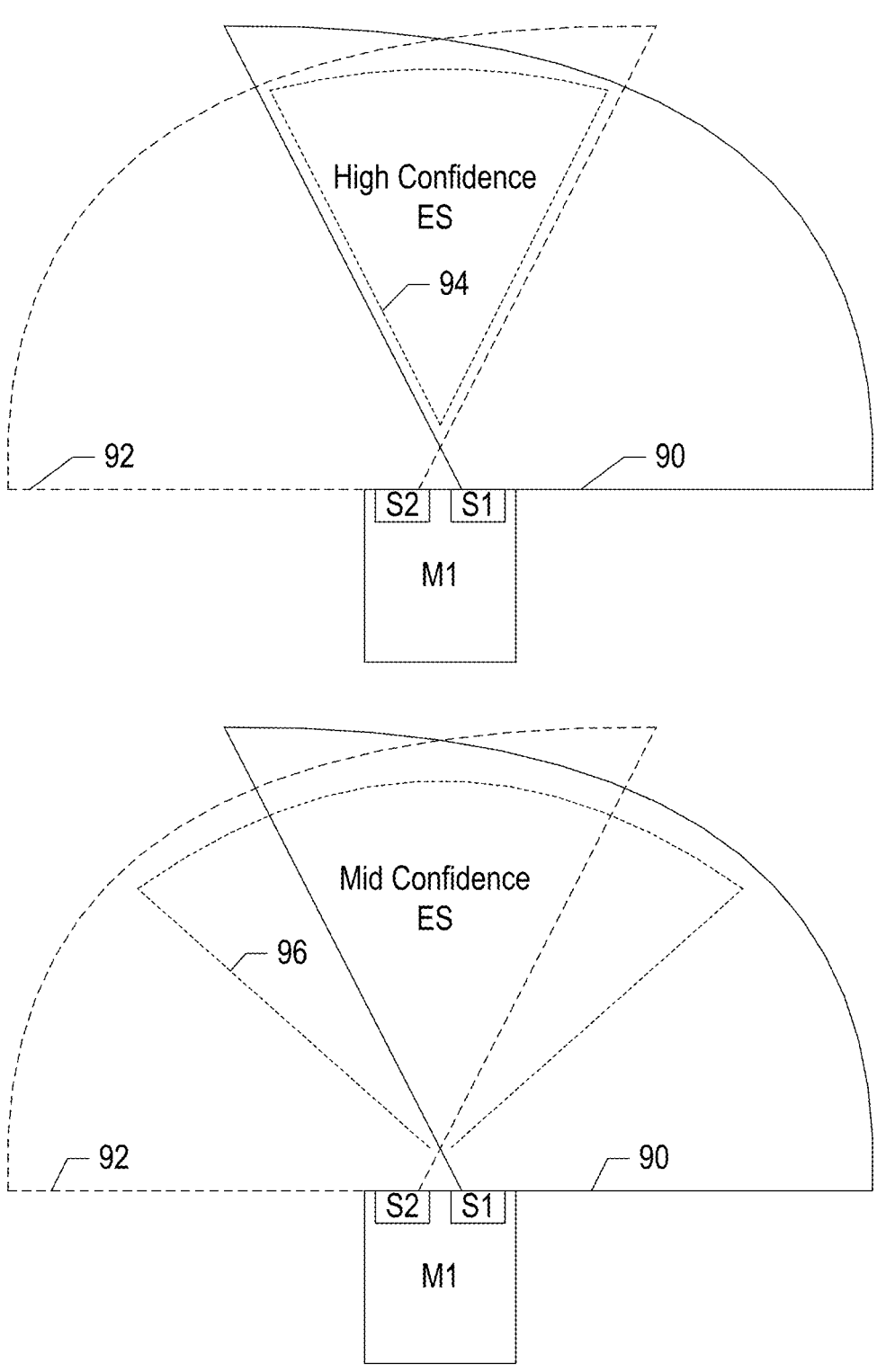
FIG. 9 is a block diagram illustrating exception stop sensing.

FIG. 9 is a block diagram illustrating various fields of view that sensors for the exception stop functionality may have. Two sensors S2 and S1 are illustrated on a mobile machine M1. The field of view of the sensor S1 is illustrated via the solid-lined shape 90 and the field of view of the sensor S2 is illustrated by a dash-lined shape 92. At the top of FIG. 9, the area of overlap of the two sensors (illustrated by dash-lined shape 94, which uses smaller dashes than the shape 92) may represent a high confidence ES object detection. That is, in the area illustrated by shape 94, an object may be detected by both sensors S1 and S2, and thus there is high confidence that the object is correctly sensed. At the bottom of FIG. 9, the shapes 90 and 92 are shown again but another area is illustrated via dash-lined shape 96 (again using smaller dashes than the shape 92). This area represented by the shape 96 may be a mid-level of confidence for ES object detection, since it includes some area that is covered by the field of view of only one sensor S1 or S2. However, the additional area of which objects are sensed may allow earlier detection of a late reveal object/obstacle that is about to enter the stop trajectory.

Combinations of the high confidence area 94 and the mid confidence area 96 may be used to signal an exception stop to the act phase 26. Alternatively, one of the areas 94 or 96 may be used.

Figure 10:
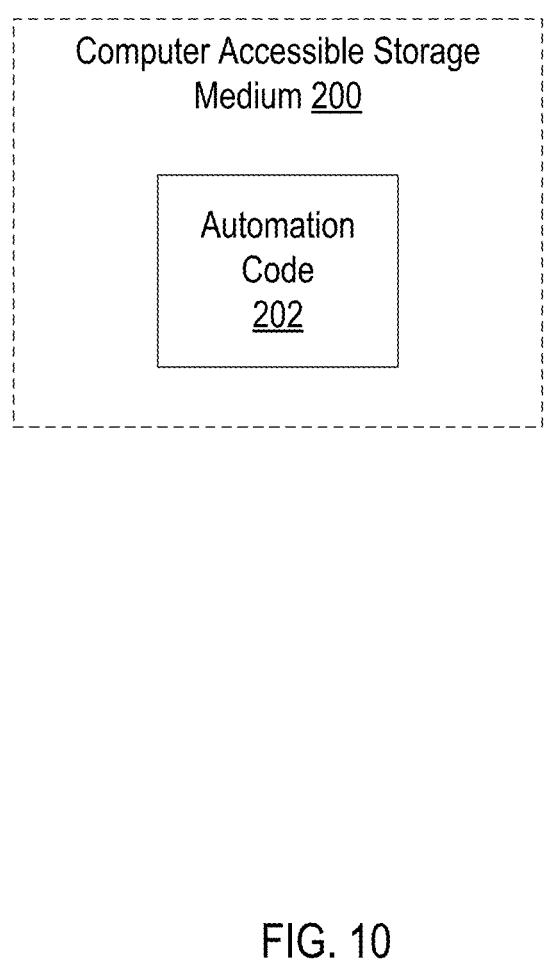

Turning next to FIG. 10, a block diagram of one embodiment of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, a non-transitory computer accessible storage medium may be volatile (and may lose the stored instructions/data in response to a power down) or non-volatile.

The computer accessible storage medium 200 in FIG. 10 may store automation code 202. The automation code 202 may include instructions which, when executed by a computer or computers 14, 16, or 80, implement the operation described for the various code above, particularly with regard to FIGS. 2, 3, and 5. A carrier medium may include computer accessible storage media as well as transmission media such as wired or wireless transmission.

More particularly, in an embodiment, the computer accessible storage medium 200/automation code 202 may comprise a plurality of instructions, which, when executed, implement operations comprising: generating a plurality of trajectories at a plurality of points in time in one or more first computers, wherein a given trajectory of the plurality of trajectories includes a first segment and a second segment delineated by a difference between respective points in time of the plurality of points in time, wherein the first segment is derived from a destination trajectory that leads a mobile machine toward a destination, and wherein the second segment is derived from a stop trajectory that leads the mobile machine to a stop based on sensor data from a plurality of sensors up to a given point in time at which the given trajectory is generated; and controlling a plurality of actuators of the mobile machine to follow a most recently received trajectory of the plurality of trajectories by one or more second computers coupled to the one or more first computers. In an embodiment, the instructions, when executed on the one or more second computers, continue following the most recently received trajectory in the event that a subsequent one or more of the plurality of trajectories are not received at respective expected points in time. In an embodiment, the instructions, when executed on the one or more second computers, enable a different source than the one or more first computers based on a failure to receive N of the plurality of trajectories at respective executed points in time, wherein N is a positive integer, and wherein the different source is configured to provide an automatic exception stop trajectory based on detection of at least one obstacle in the most recently received trajectory.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation-[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An automation system, comprising:
one or more computing systems configured to:
    periodically access a stop trajectory for a movable machine to bring the movable machine to a stop based on sensor data up to a point in time at which the stop trajectory is generated, wherein the stop trajectory includes an initial segment that parallels a destination trajectory until a next point in time when the movable machine has traversed further along the destination trajectory and at which another instance of the stop trajectory is generated, wherein the sensor data is from a plurality of sensors on the movable machine that sense surroundings of the movable machine;
    control a plurality of actuators in the movable machine to cause the movable machine to follow a current instance of the stop trajectory;
    replace the current instance of the stop trajectory with a subsequent instance of the stop trajectory accessed by the one or more computing systems; and
    control the plurality of actuators to follow the subsequent instance of the stop trajectory accessed by the one or more computing systems.

2. The automation system of claim 1, wherein the one or more computing systems are configured to:
    continue following the most recently accessed stop trajectory in the event that a subsequent one or more instances of the stop trajectory are unavailable at respective expected points in time.

3. The automation system of claim 1, further comprising:
    the plurality of sensors, wherein the plurality of sensors includes cameras, radio detection and ranging (radar) sensors, or light detection and ranging (lidar) sensors.

4. The automation system of claim 1, wherein the one or more computing systems are configured to:

generate the stop trajectory based on which path of one or more paths the movable machine is moving, presence of one or more objects in the one or more paths, and presence of a stop zone along the one or more paths.

5. The automation system of claim 1, wherein the one or more computing systems are configured to:
generate the stop trajectory to a point in a stop zone along a pathway on which the movable machine is moving based on existence of an unobstructed path between the movable machine and the stop zone.

6. The automation system of claim 5, wherein the one or more computing systems are configured to:
generate the stop trajectory to stop in a current path of travel for the movable machine based on one or more obstructions between the movable machine and the stop zone.

7. The automation system of claim 5, wherein the one or more computing systems are configured to:
generate the stop trajectory to stop in a current path of travel for the movable machine based on an absence of the stop zone.

8. The automation system of claim 1, wherein the one or more computing systems are configured to:
detect that the subsequent instance of the stop trajectory has not been received for at least N iterations of the period at which the subsequent instance should have been received; and
enable an exception stop indication based on the detection.

9. The automation system of claim 8, wherein the one or more computing systems are configured to:
generate the exception stop indication based on one or more sensors detecting that a previously undetected object is in the current instance of the stop trajectory.

10. The automation system of claim 1, wherein the movable machine is a robot that performs a task within a confined space.

11. A method, comprising:
periodically accessing, by one or more computing systems, a stop trajectory for a movable machine to bring the movable machine to a stop based on sensor data up to a point in time at which the stop trajectory is generated, wherein the stop trajectory includes an initial segment that parallels a destination trajectory until a next point in time when the movable machine has traversed further along the destination trajectory and at which another instance of the stop trajectory is generated, wherein the sensor data is from a plurality of sensors on the movable machine that sense surroundings of the movable machine;
controlling, by the one or more computing systems, a plurality of actuators in the movable machine to cause the movable machine to follow a current instance of the stop trajectory;
replacing, by the one or more computing systems, the current instance of the stop trajectory with a subsequent instance of the stop trajectory accessed by the one or more computing systems; and
controlling, by the one or more computing systems, the plurality of actuators to follow the subsequent instance of the stop trajectory accessed by the one or more computing systems.

12. The method of claim 11, further comprising:
controlling, by one or more computing systems, the plurality of actuators in the movable machine to cause the movable machine to continue following the most recently accessed trajectory in the event that a subsequent one or more trajectories cannot be accessed at respective expected points in time.

13. The method of claim 11, wherein the stop trajectory is generated based on geo-location data associated with the movable machine.

14. The method of claim 11, wherein the stop trajectory is generated based on current environmental conditions associated with the movable machine.

15. The method of claim 14, further comprising:
accessing, by one or more computing systems, an exception stop trajectory based on a failure to access one or more subsequent instances of the stop trajectory and based on detection of at least one obstacle in the most recently accessed stop trajectory.

16. A non-transitory computer readable medium having program instructions stored therein that are executable by one or more computing systems to perform operations comprising:
periodically accessing a stop trajectory for a movable machine to bring the movable machine to a stop based on sensor data up to a point in time at which the stop trajectory is generated, wherein the stop trajectory includes an initial segment that parallels a destination trajectory until a next point in time when the movable machine has traversed further along the destination trajectory and at which another instance of the stop trajectory is generated, wherein the sensor data is from a plurality of sensors on the movable machine that sense surroundings of the movable machine;
controlling a plurality of actuators in the movable machine to cause the movable machine to follow a current instance of the stop trajectory;
replacing the current instance of the stop trajectory with a subsequent instance of the stop trajectory accessed by the one or more computing systems; and
controlling the plurality of actuators to follow the subsequent instance of the stop trajectory accessed by the one or more computing systems.

17. The computer readable medium of claim 16, wherein the operations further comprise:
continuing to control the plurality of actuators to follow the subsequent instance of the stop trajectory until another instance of the stop trajectory is accessible.

18. The computer readable medium of claim 16, wherein the operations further comprise:
generating the stop trajectory to stop in a current path of travel for the movable machine based on one or more obstructions between the movable machine and a stop zone.

19. The computer readable medium of claim 16, wherein the operations further comprise:
accessing an exception stop trajectory based on detection of at least one obstacle in the current instance of the stop trajectory.

20. The computer readable medium of claim 19, wherein the exception stop trajectory follows the most recently accessed stop trajectory but terminates at an earlier point.

* * * * *